Nov. 17, 1953 — E. P. PEREGRINE — 2,659,221
TORQUE TRANSMITTING DEVICE
Filed July 8, 1948 — 3 Sheets-Sheet 3

INVENTOR.
EDGAR PHILLIPS PEREGRINE
BY
Sawyer & Kennedy
ATTORNEYS.

Patented Nov. 17, 1953

2,659,221

UNITED STATES PATENT OFFICE 2,659,221

TORQUE TRANSMITTING DEVICE

Edgar Phillips Peregrine, Tynemouth, England, assignor to The Parsons and Marine Engineering Turbine Research and Development Association, Wallsend, England Application July 8, 1948, Serial No. 37,667

3 Claims. (Cl. 64—26)

This invention relates to torque transmitting devices. More particularly, the invention is concerned with torque transmitters of the type in which driving and driven rotors are coupled by means of a fluid contained in spaces between vanes of the two rotors, so that the torque transmitted is proportional to the fluid pressure.

In accordance with the present invention, the driven element is formed with radial vanes extending axially from both faces and cooperating with similar vanes carried by the driving member, the various vanes being supported by one radially extending edge and permitting a very compact construction. The fluid connections to the spaces between vanes are made by means of conduits in the driving member, which, together with parts rigid with it, forms an enclosure for the driven member and a part driven by it. Pressure measuring passages segregated from the fluid supply passages are provided and avoid errors resulting from pressure drop of the fluid in passing through the supply passages. The supply connections are manifolded and the driven member is grooved for interconnecting spaces on its opposite sides, so as to equalize pressure in similar spaces between the vanes.

A torque transmitting device embodying the invention in a preferred form of embodiment will now be described with reference to the accompanying drawings.

Referring to the accompanying diagrammatic drawings:

Figure 7 is an end elevational view of the inner vane ring of Figure 1, and

Figure 8 is a cross-sectional view on the line 7—7 of Figure 7.

Figure 1:
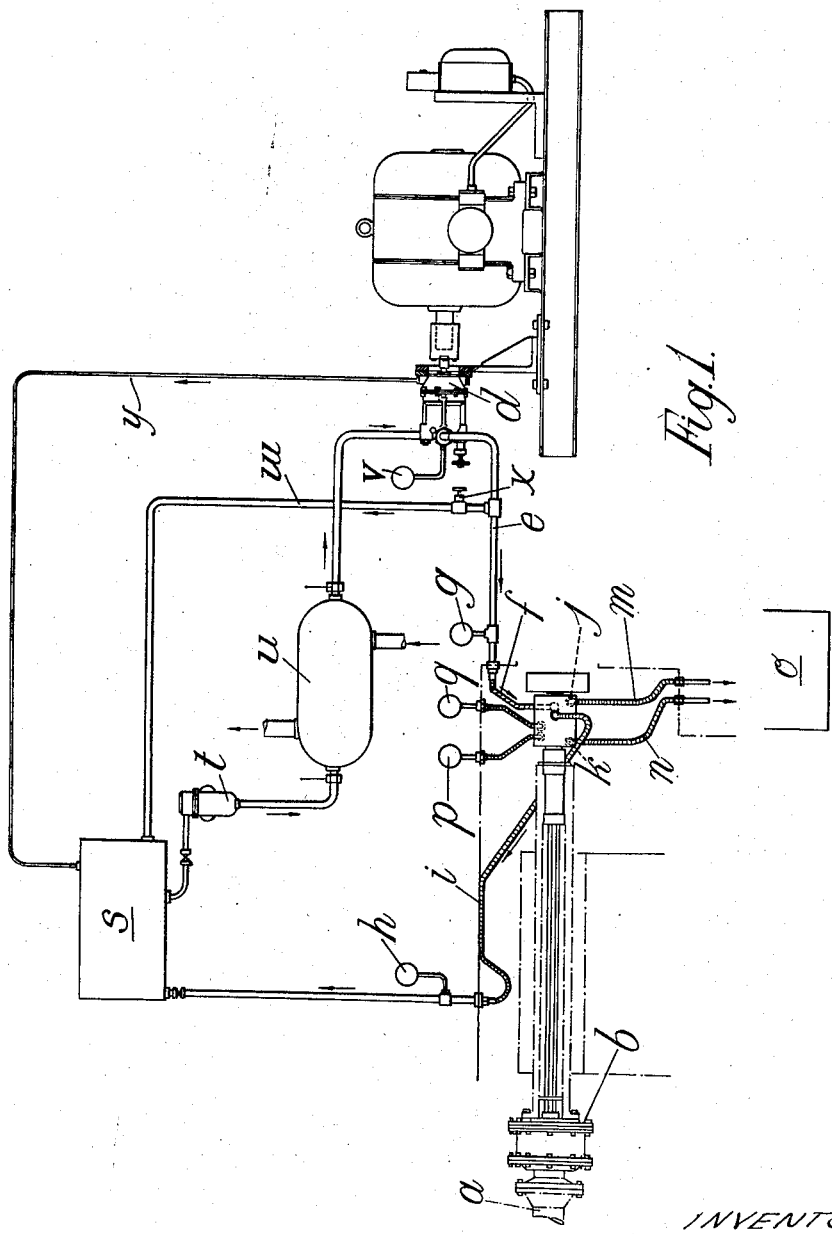
Figure 1 is a view of a torque loader lay-out embodying the present invention.
Figure 2:
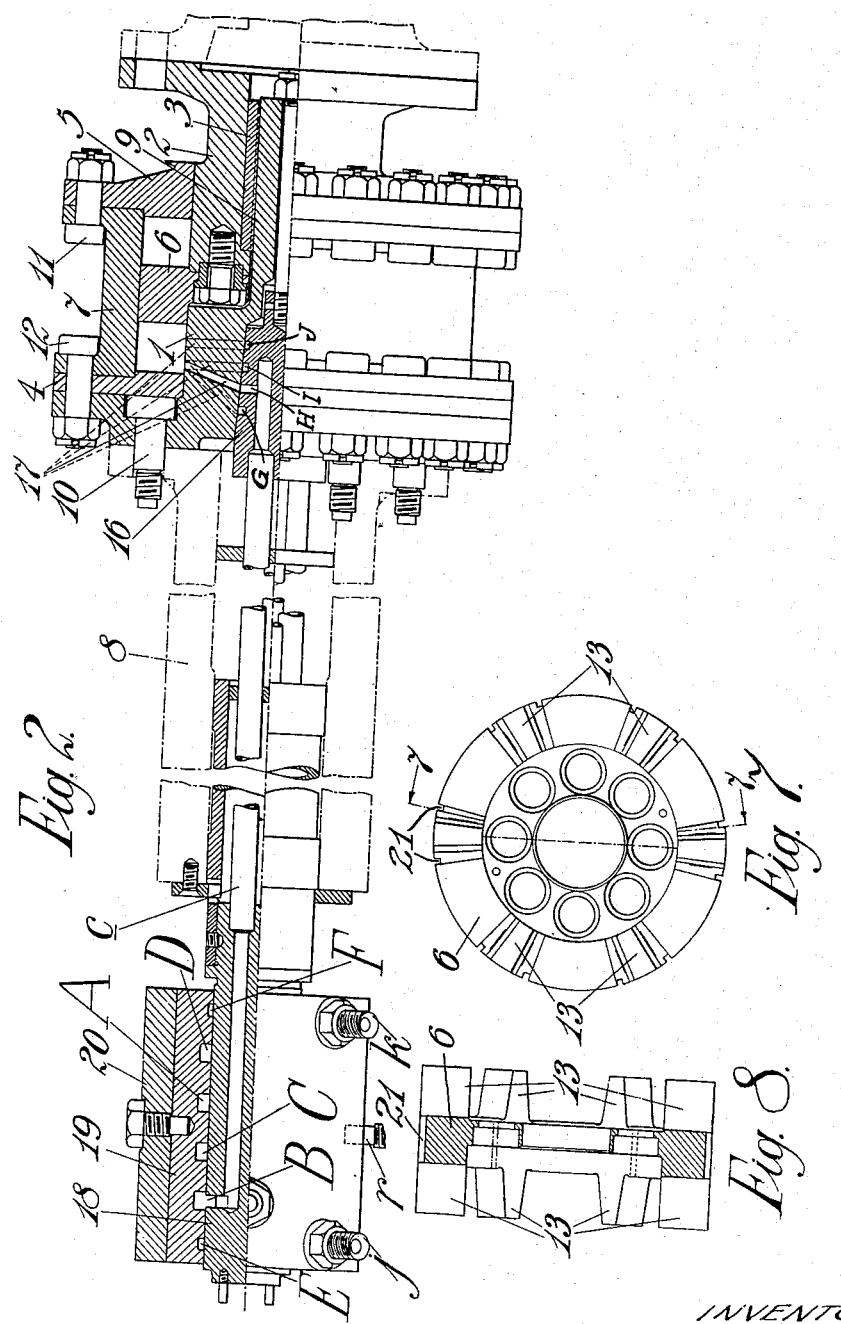
Figure 2 is a longitudinal sectional view of the torque loader of Figure 1.
Figure 3:
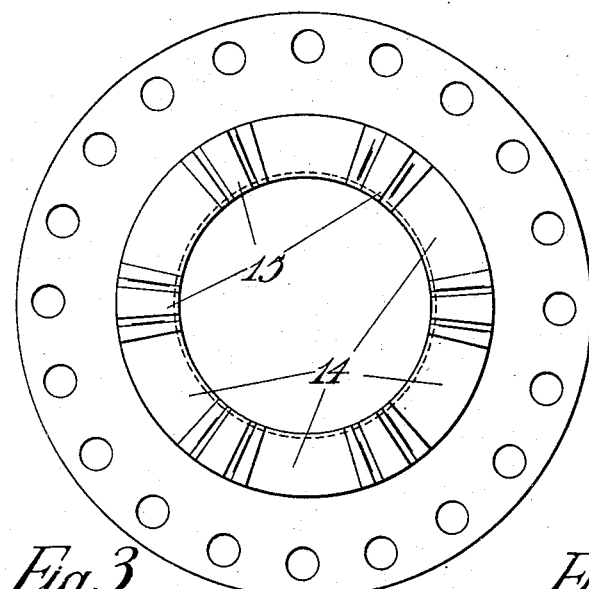
Figures 3 and 4 are end and side elevational views respectively of one of the outer vane rings of the torque loader of Figure 1.
Figure 4:
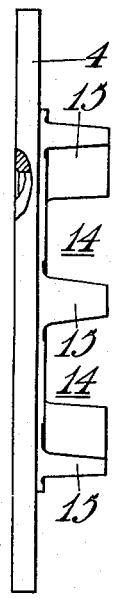
Figure 6:
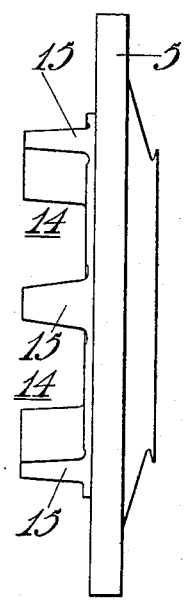
Figures 5 and 6 are end and side elevational views respectively of the other outer vane ring of Figure 1.
Figure 5:
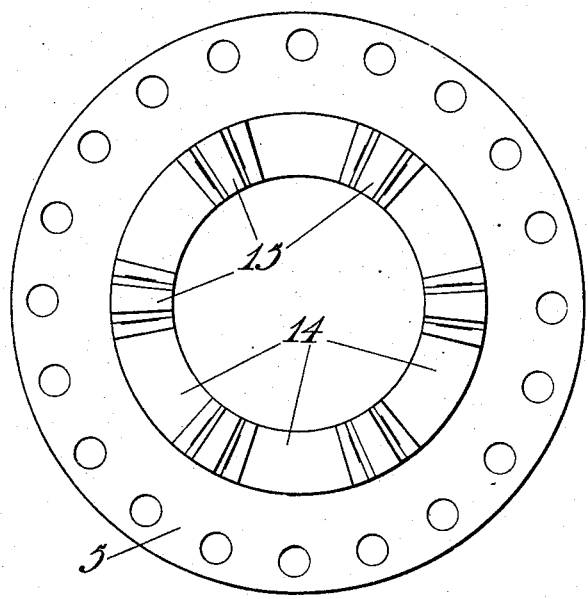

In carrying the invention into effect according to one form as illustrated by way of example in Figure 1 of the accompanying drawings, to a driving shaft $a$ is connected torque loading mechanism $b$ details of which are shown in Figures 2 to 8. This mechanism comprises a driven member 1 and coaxial driving member 2, the driven member 1 being connected by bolts 10 to a driven pinion 8 and the driven member 1 being connected by means of bolts 11 and 12 to members 4, 5 and 7. Rigidly connected to the driving member 2 is a ring 6 (Figures 7 and 8) which has vanes 13 in both axial directions; these vanes are arranged to project into corresponding recesses 14 between vanes 15 on the members 4 and 5 (Figures 2 to 6) in such a manner that rotational displacements of the member 6 relative to the members 4 and 5 are possible through a limited arc. The extent of this arc may be controlled by the number and thickness of the vanes in members 4, 5 and 6. Communicating grooves 21 are cut on the periphery of the member 6 so that opposite volumes are in communication. These volumes can be varied by the rotational movement of the member 6 relative to the members 4 and 5 combined.

The device operates by introducing oil or any appropriate fluid at pressure on to the clockwise faces of the vanes 13 of member 6 in Figure 8 and by maintaining a controlled lower pressure on the counter-clockwise sides of the same face.

By this means forces are produced which enable the member 6 to sweep out these volumes and so to cause a relative torsional displacement between the member 6 and members 4 and 5. Member 1 is connected to a hardened journal 18 which is brought out to overhang and project from the driving pinion 8, with which the device is associated. A journal bush 19 in a housing 20 has four oil connections to four annular grooves A, B, C and D and two end grooves E, F. The annuli A, B, C and D are in fluid connection with the volumes between the vanes of rings 4, 5 and 6 by way of annular grooves G, H, I and J in a coned member 16 secured rigidly within the member 1. Each of the grooves G, H, I and J is connected to a set of four radial holes 17 communicating with the appropriate swept volume thereby introducing a pressure equalizing effect. Annuli A and C connect by pipes $c$ to volumes on the counter-clockwise side of the vanes 13 whereas annuli B and D connect to the clockwise side.

The delivery outlet of a variable pressure pump $d$ is connected by way of pipes $e$ and $f$ to groove B, a pressure gauge $g$ being connected to the pipe $e$. A further pressure gauge $h$ connected by a pipe $i$ to the annulus C measures pressure on the return flow.

The grooves E and F are connected by way of outlets $j$, $k$ to pipes $m$, $n$ discharging leak-off oil to a tank $o$. The annuli A and D are connected to pressure gauges $p$, $q$.

The flow passages B and C are segregated from the pressure measuring passages A and D in order to avoid the introduction of errors due to fluid friction in the flow passages.

The housing 20 and bush 19 are prevented from rotation by a stop pin $r$ and are arranged to float on the shaft extension 18, the connections to the pump and gauges being made by way of flexible hose connections.

An extension 9 on the member 1 locates member 2 by means of a bushed bearing 3 and the vanes on members 4, 5 and 6 are arranged with clearances between them and members 1 and 2 and 7, whereby slight leakage under laminar flow conditions obtains whereby a minimum of friction is introduced.

In the arrangement shown in Figure 1, the pipe $i$ connected to the pressure gauge $h$ is continued upwards to a tank $s$ from which liquid is fed to the pump $d$ by way of a strainer $t$ and heat exchanger $u$ and to which a tank-return-flow pipe $y$ is connected. A pump pressure gauge $v$ and a by-pass connection $w$ with cock $x$ are also provided.

The resistance to the drive must be encountered before the full arc is traversed and a force proportional to the difference in pressures between the clockwise and counterclockwise faces of the vanes manifests itself as the torque being transmitted through the device. The magnitude of this torque is controlled by controlling the fluid pressures. This control is effected by means of the pump $d$.

When the coupling is in rotation the pressures indicated by the pressure gauges $p$ and $q$ will not correspond to the pressures on the vanes due to the introduction of centrifugal fluid pressure loading but the high pressure and the low pressure sides of the vanes will be subject to equal increments of pressure and as far as the applied torque is concerned no change in the true value results.

A further desirable feature is the balancing of pressures of the vanes, i. e., by so forming both driven and driving members that the net reaction of the oil pressures in the axial direction is zero; this is achieved in the above example by providing vanes on both sides of member 6 and by providing a vent groove in the bush 3. This latter precaution eliminates the possibility of any unbalanced thrusts forming inside the coupling between members 1 and 2 due to hydraulic pressure.

It is desirable to form the bush 19 of non-seizing material to permit of running with very small clearances and so minimize the leakage. In any case it is possible to inhibit leakages by the introduction of the leak-off grooves E, F.

What is claimed is:

1. A fluid torque transmitting device comprising a driving member embodying two sets of vanes, each vane being supported rigidly on said member by one radially extending edge, each vane extending axially and being unsupported at all other edges, a co-axially driven member furnished with a pair of sets of similar vanes, said latter vanes lying between said first-mentioned vanes and means for maintaining fluid under two different pressures in the spaces between the vanes at the respective two sides of the vanes on the driving member.

2. A fluid torque transmitting device as claimed in claim 1 incorporating liquid flow passages and pressure measuring passages wherein said former passages are segregated from said latter passages in order to avoid the introduction of errors due to fluid friction in the former passages.

3. A fluid torque transmitting device as claimed in claim 1, incorporating manifolds for equalizing the pressures in volumes swept by said vanes.

EDGAR PHILLIPS PEREGRINE.

References Cited in the file of this patent

UNITED STATES PATENTS

| Number | Name | Date |
| --- | --- | --- |
| 1,224,669 | Rounds | May 1, 1917 |
| 1,685,839 | Du Bois | Oct. 2, 1928 |
| 2,072,561 | Kuhns et al. | Mar. 2, 1937 |
| 2,305,439 | Miller | Dec. 15, 1942 |